United States Patent [19]
Alaimo et al.

[11] Patent Number: 4,630,190
[45] Date of Patent: Dec. 16, 1986

[54] SERVO CONTROL APPARATUS FOR A DISK DRIVE

[75] Inventors: Ben Alaimo, Campbell; Robert F. Couse, Saratoga, both of Calif.

[73] Assignee: SyQuest Technology, Fremont, Calif.

[21] Appl. No.: 581,702

[22] Filed: Feb. 21, 1984

[51] Int. Cl.$^4$ .................. G11B 21/10; G05B 15/02
[52] U.S. Cl. .................. 364/167; 318/603; 360/77; 364/183
[58] Field of Search .................. 364/167–171, 364/183; 360/77, 78; 318/601, 603, 608

[56] References Cited

U.S. PATENT DOCUMENTS

| | | | |
|---|---|---|---|
| 4,157,577 | 6/1979 | Porter, Jr. et al. | 360/77 |
| 4,380,033 | 4/1983 | Bacrania | 364/183 X |
| 4,480,279 | 10/1984 | Hashimoto | 318/616 X |
| 4,488,187 | 12/1984 | Alaimo | 360/78 X |
| 4,499,510 | 2/1985 | Harding et al. | 360/78 X |
| 4,511,938 | 4/1985 | Betts | 360/77 |
| 4,524,397 | 6/1985 | Chalmers et al. | 360/77 |

Primary Examiner—Joseph Ruggiero
Attorney, Agent, or Firm—Fliesler, Dubb, Meyer & Lovejoy

[57] ABSTRACT

Disclosed is a servo control apparatus for controlling a servo means that positions a recording head over a disk-shaped data storage medium. If the disk-shaped data storage medium is improperly mounted on a disk drive causing wobble of the disk as it turns, then the problem of runout occurs so that each of the tracks of data on the disk do not pass directly under the head throughout the whole rotation of the disk. The present invention provides a reference track near the outside circumference of the disk on which reference data is stored in a plurality of bursts spaced around the reference track. The servo control apparatus detects the reference data for each of the bursts and calculates the position of the centerline of the reference track with respect to the head for each of the bursts. From this calculation for 8 bursts spaced around the reference track, a computer means generates a runout factor which is used to control the servo means to position the head compensating for runout for each of the data tracks on the disk.

8 Claims, 10 Drawing Figures

FIG_1

FIG_2

FIG_3

FIG_4

FIG_5A

FIG_5B

FIG_6

FIG_7

FIG_8

FIG_9

SERVO CONTROL APPARATUS FOR A DISK DRIVE

FIELD OF THE INVENTION

The present invention relates generally to servo control apparatus, and more particularly, to servo control apparatus for use on a drive for a disk shaped data storage medium.

BACKGROUND OF THE INVENTION

In the field of data processing, data are stored on and retrieved from a data storage medium. Typically, the storage medium has at least one data track on which data are written or read by a recording head, while a servo control mechanism precisely positions the head relative to the track. A common example of the data storage and retrieval system is disk drive which includes at least one data storage disk having a plurality of concentric circular data tracks, a read/write recording head to read or write data on a magnetic track, and a servo control system to cause the recording head to seek to the selected track and then precisely center the head over the track. Appropriately stored servo data provide information for seeking a selected track and for maintaining the recording head centered on the track.

Various types of servo control systems and servo data are employed to carry out the above-mentioned functions. A common problem with the prior servo control systems, particularly those portions which are used to maintain the recording head centered on a selected track, is that they employ analog design concepts requiring additional components such as an automatic gain control to maintain accurate centering of the recording head relative to the track centerline. Furthermore, the prior servo data, particularly that stored for maintaining the recording head centered on the track, are relatively complicated and involved. Another disadvantage of the prior art is that the servo control system and/or servo data usually include additional components, data and algorithms to compensate for the effects of temperature and humidity on the storage medium that cause the track to expand or contract relative to one another. Thus prior art systems are costly and complex.

These problems are addressed generally by the invention entitled, "SERVO CONTROL APPARATUS" described in U.S. patent application, Ser. No. 385,105, filed June 4, 1982 U.S. Pat. No. 4,488,187, invented by Ben Alaimo and owned by an Assignee in common present application, which Application is hereby incorporated by reference as if fully set forth herein.

One problem for disk-shaped data storage media and disk drives arises because the disk-shaped data storage medium is mechanically secured on the drive. Thus the disk may be secured slightly off center causing the disk to wobble slightly as it is turned by the disk drive. This wobble will cause the data tracks to rotate so that they run out from under the recording head during part of the rotation. Thus the problem caused by the wobble is called runout. Runout can be caused when a spindle on the disk drive which is used for alignment of the disk is either not perfectly vertical or misaligned in some manner, or a bad bearing in the disk drive may cause wobble. Further, wobble which causes runout may occur if the disk does not lay perfectly flat on the table of the disk drive.

Thus, there is a need for a servo control apparatus which detects and compensates for runout by positioning of the head in order to minimize the effects of runout.

SUMMARY OF THE INVENTION

In accordance with the foregoing, the present invention provides a servo control apparatus for controlling a servo means for positioning a head that reads and writes data on a disk-shaped data storage medium that detects and compensates for runout.

The disk-shaped data storage medium has a plurality of concentric circular data storage tracks, each of the data storage tracks having a centerline. The disk-shaped data storage medium (disk) is secured on a rotatable drive which turns the disk so that a head properly positioned over the centerline of a data storage track will read around the data storage track.

The servo control apparatus of the present invention comprises a reference track formed on one of the plurality of concentric circular data storage tracks on the disk. The reference track has a plurality of bursts of reference data spaced around the reference track. The bursts of reference data contain data indicating the position of the head relative to the centerline of the reference track as the head reads the reference data on the burst. A decode means in communication with the head for decoding the reference data as the head reads the burst generates a reference count, for each burst read, representing the position of the head relative to the centerline of the reference track as the head reads a particular burst.

A computer means for storing the plurality of reference counts, calculating a runout factor from said plurality of reference counts indicating the deviation of the centerline of the reference track from the head as the head reads around the reference track and generating a runout signal from the runout factor is provided. Control means in communication with the computer means and with the servo means causes the servo means to position the head in response to the runout signal so that the head is positioned to reduce the deviation of the centerlines of the plurality of concentric circular data storage tracks from the head as the rotatable drive turns disk-shaped storage medium for reading and writing by the head.

Each of the concentric circular data storage tracks other than the reference track includes a servo sector having reference data stored therein containing data indicating the position of the head relative to the centerline of the track as the head reads across the servo sector. The decode means generates a track reference count for each track for storage by the computer means and the runout signal is generated in response to the track reference count and the runout factor so that for each track in the disk-shaped data storage medium, the servo means compensates for the runout detected when the reference track was read.

DETAILED DESCRIPTION OF THE PREFERRED EMBODIMENT

With reference to the drawings, the preferred embodiment of the present invention is described.

Figure 1:
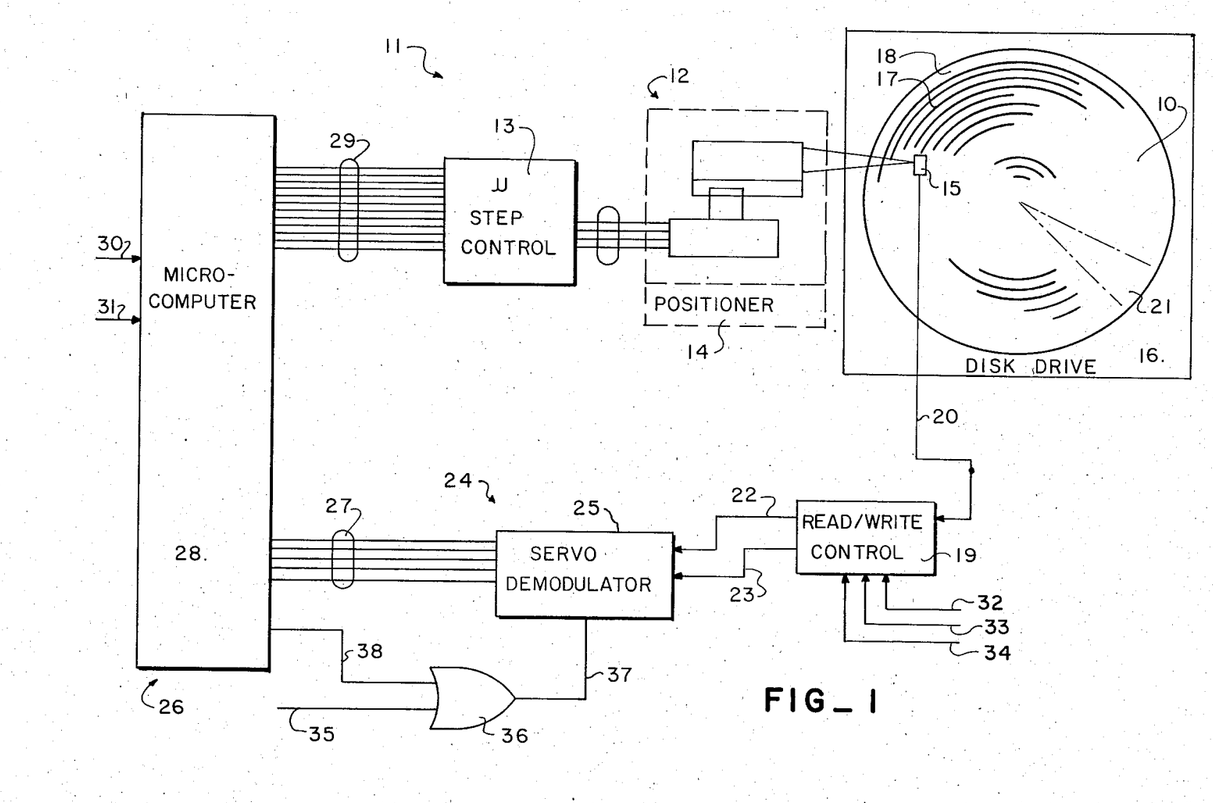
FIG. 1 is a block diagram of one embodiment of the present invention.

FIG. 1 illustrates a disk-shaped data storage medium 10 and a servo control apparatus 11 for use in controlling a servo means 12 such as the microstep motor controller 13 and the microstep positioner 14 which positions a recording head 15 for reading data on the disk-shaped data storage medium 10.

The disk-shaped data storage medium (disk) 10 is secured on a disk drive 16 which rotates the disk-shaped data storage medium 10. The disk-shaped data storage medium 10 includes a plurality of concentric circular data storage tracks 17 on the surface 18 of the disk-shaped data storage medium 10.

The surface 18 of the disk-shaped data storage medium 10 is typically a magnetic recording film on which data is written along the concentric circular data storage tracks 17. For hard disk technology, each of the tracks 17 are typically from 1000 to 2500 microinches across so that there may be as many as 1,000 tracks per inch on the disk-shaped data storage medium 10. Of course other disk-shaped data storage medium technologies will have varying sizes of tracks.

In addition to writing data onto the tracks 17, the head 15 may be manufactured so that it also reads data from the track 17 and erases data when desired from the track 17. It can be seen that the head 15 must be precisely positioned over each of the tracks 17 in order to most efficiently read data or write data without overlapping over onto adjacent tracks. This fine adjustment is accomplished using the positioner 14 with the microstep control 13 as operated in response to the servo control apparatus 11 of the present invention.

The function of the head 15 is controlled by a conventional read/write control circuit 19 via line 20 for reading and writing data.

As described in my earlier file patent application entitled "SERVO CONTROL APPARATUS," filed June 4, 1982, Ser. No. 385,105, U.S. Pat. No. 4,488,187, servo data is stored on the disk-shaped data storage medium 10 in a servo sector 21. As the disk 10 rotates so that the servo sector 21 passes under the head 15, the head 15 detects servo data in the servo sector 21 which is communicated across line 20 to the read/write control 19. The read/write control 19 generates a data signal across line 22 and a threshold signal across 23 to a decode means 24 such as a servo demodulator 25 (described below). The decode means 24 decodes the data signal across line 22 with respect to the threshold signal across line 23 and communicates with a computer means 26 across a decode bus 27.

The computer means 26 comprise a microcomputer 28 which receives the data across the decode bus 27. In the microcomputer 28, the data is processed and stored for signalling a servo means 11 across the servo bus 29.

The microcomputer 28, which may be implemented with a microprocessor or other computer means 25, also receives conventional seek pulses on line 30 and conventional directional data on line 31 for controlling the servo means 11 during the read/write operation of the head 15. The computer means 26 signals the servo means 11 in response to seek pulses on line 30 and directional data on line 31 to seek a chosen track 17 or read across the disk 10 in a chosen direction.

Further, as can be seen in FIG. 1, the read/write control circuit 19 receives control signals to cause the head 15 to read or write data on the data surface 18 in response to conventional write data, write gate and read data control signals received on line 32, 33, and 34, respectively. Of course, other control signals may be used to control the mode of operation of the head 15.

Typically, for a disk-shaped data storage medium 10 driven by a disk drive 16, an index signal is generated mechanically for every rotation of the disk 10. For instance, the disk 10 may be mounted on a plate (not shown) with a notch in the metallic plate. As the notch in the metallic plate passes a magnetic sensor, a signal is generated for each rotation of the disk 10 on the disk drive 16. The index signal can be generated in a variety of ways. Nonetheless, as can be seen in FIG. 1, the index signal which is generated for each rotation is received across line 35 into the OR-gate 36 and from the OR-gate 36 across line 37 into the decode means 24. Along with the mechanical index signal across line 35, a pseudo-index signal is generated by the computer means 26 across the pseudo-index line 38 to the OR-gate 36. The function of the index and pseudo-index signals in regard to the present invention is described below. It is sufficient at this point to say that the decode means 24 receives the mechanical index or the pseudo-index signals through line 37 in order to initiate the demodulation sequence for the purposes of the present invention. The index signal across line 35 may be generated to correspond with the servo sector 21 or otherwise positioned around the disk-shaped data storage medium 10 as suits the user. The index signal serves to provide a reference point for the control of the machine.

The present invention is concerned primarily with controlling the servo means 11 to position the head 15 so that the wobble caused by improper alignment of the disk-shaped data storage medium 10 on the disk drive 16 minimizes the runout of the data storage track 17 as it is rotated under the head 15. Because the runout condition is due to mechanical state of the disk-shaped data storage medium 10, it is found that the detection of runout on a single of the plurality of concentric circular data storage tracks 17 will suffice for controlling the servo means 11 to position the head 15 to minimize the effect of runout for all of the plurality of concentric circular data storage tracks 17. Thus, the present invention provides a reference track 39 (see FIG. 2) formed on one of the plurality of concentric circular data storage tracks 17 for detecting the runout and calculating the proper positioning of the head 15 to correct the runout for all of the tracks 17.

Figure 2:
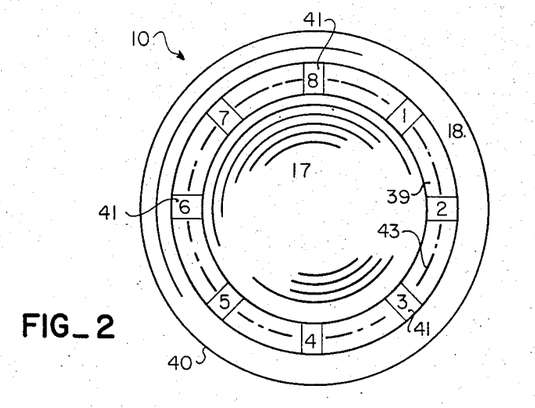
FIG. 2 is a schematic of a disk-shaped storage medium with a reference track greatly enlarged for illustration of the present invention.

FIG. 2 illustrates a disk-shaped data storage medium 10 with a reference track 39 formed on one of the plurality of concentric circular data storage tracks 17. The reference track 39 in FIG. 2 is greatly enlarged to facilitate the description of the reference track 39.

Spaced around the reference track 39 are a plurality of bursts 41 of reference data containing data indicating the position of the head 15 relative to the centerline of the reference track 39 as the head reads across the burst 41. In the preferred embodiment, the reference track 39 is positioned just inside the guard band 42 near the outside circumference 40 of the recording surface 18 of the disk-shaped data storage medium 10. The guard band 42 is a track of data indicating the outside edge of the disk 10 which is used by the apparatus to avoid running a head 15 off of the disk 10.

In the preferred embodiment, the reference track 39 which is used for the detection of runout includes 8 bursts of reference data numbered 1 through 8 in FIG. 2, spaced equiradially around the reference track 39.

The reference track 39 has a centerline 43 over which the head 15 is centered to read the data in the reference track 39. If the disk 10 is mounted on the disk drive 16 so that there is no runout, then as the disk 10 turns under the head 15, the head 15 will remain centered on the centerline 43 for each of the eight bursts 41. However, if a small amount of wobble or runout exists, then as the disk 10 rotates, the reference track 39 will turn so that the head 15 will cross each of the bursts 41 at a slightly different position relative to the centerline 43 of the reference track 39. By detecting the deviation from the centerline 43 by the head 15 along reference track 39 as the disk 10 turns for each of the bursts 41, the servo control apparatus 11 of the present invention can detect runout occurring because of the way that the disk 10 is mounted. If the deviation is small enough, the head 15 can be positioned to minimize the effects of the runout. If the deviation is too great, causing the head 15 to drift off of the reference track 39 to a degree that hinders the detection of data on the track 39, then the servo control apparatus 11 of the present invention will generate a signal indicating that the disk 10 is improperly mounted and must be remounted or discarded.

Figure 3:
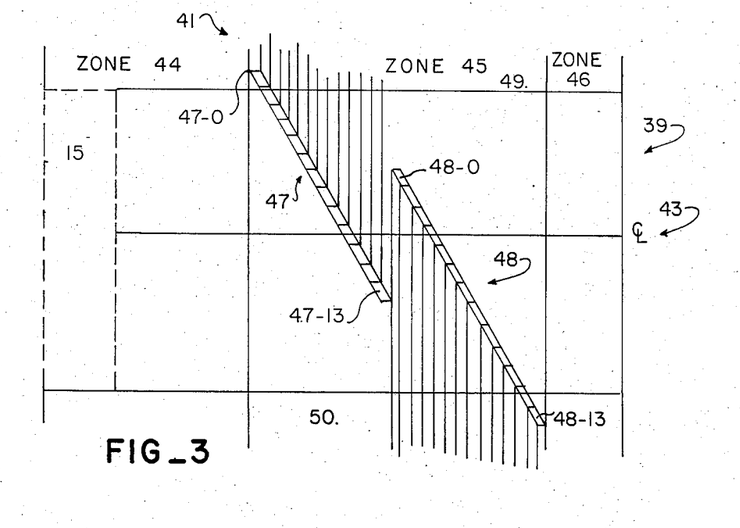
FIG. 3 is an illustration of one embodiment of the servo data of the present invention.

FIG. 3 illustrates a burst 41 of the reference data stored in each of the plurality of bursts 41 on the reference track 39. Reference track 39 has a centerline 43. The recording head 15 is shown in dotted lines which indicate the head 15 centered perfectly over the reference track 39 at the burst 41 as it would exist in the theoretical best case.

The reference data for each burst 41 consists of 64 bytes of data divided into three zones: 44, 45 and 46. The first zone is called a first 2F zone 44, having 30 bytes (not illustrated in figure). The first 2F zone 44 when being detected by the head 15 indicates the start of the reference data for the burst 41.

The second zone, called a servo data zone 45, stores servo data that indicate the position of the centerline 43 of the reference track 39 at the burst 41 with respect to the head 15 as the burst 41 rotates underneath the head 15. The reference data in the servo data zone 45 includes for each burst 41 a plurality of first servo data 47 and a plurality of second servo data 48. Preferred embodiment there are 14 bytes of first servo data 47 numbered 47-0 through 47-13. Further, there are an equal number of second servo data 48 numbered 48-0 through 48-13. The plurality of first servo data 47 is stored on the burst 41 so that it indicates the deviation of the head 15 to one side 49 of the reference track 39, while the plurality of second servo data 48 are stored across the burst 41 so that it indicates the deviation of the head 15 to the other side 50 of the reference track 39 as described below.

More particularly, the plurality of first servo data 47 are stored on the reference track 39 so that they extend partially outside one side 49 of the reference track 39 substantially across the centerline 43 and partially to the other side 50 of the centerline 43. In a similar manner, the plurality of servo data 48 extend from partially the other side 49 of the centerline substantially across the centerline 43 and partially outside the one side 50 of the centerline 43. Because the head 15 generates the signal as it reads a byte of data on a track 17 in proportion to the length of the field in which the particular byte is stored which the head passes over, the plurality of first servo data 47 and plurality of second servo data 48 extend in parallel fields across the reference track 39 at the burst 41 which descend at an angle to the centerline 43 away from the centerline 43. Thus as the head 15 passes over the burst 41 as illustrated in FIG. 3, the intensity of the signal generated by each of the plurality of first servo data 47 will increase as the head passes from byte 47-0 to byte 47-13 because progressively more and more of the byte is stored across the path of the head 15. Likewise, as the head passes over the plurality of second servo data 48, the intensity of the signal detected by the head 15 will decrease as the head proceeds along the centerline 43. In a manner described below, as the head 15 reads across the plurality of first servo data 47 and plurality of second servo data 48, the head 15 will generate signals which indicate the position of the centerline 43 relative to the head 15 in the servo data zone 45. In the preferred embodiment, the servo data zone 45 includes 28 bytes of data as mentioned above.

The last zone, called the second 2F zone 46, includes a plurality of 2F bytes (not illustrated in the figure). In the preferred embodiment there are six 2F bytes in the second 2F zone 46 indicating the end of the reference data in the burst 41. Thus, there are a total of 64 bytes of reference data for each burst 41 in the preferred embodiment. The same pattern of reference data is repeated for each of the bursts 41 around the reference track 39.

Figure 4:
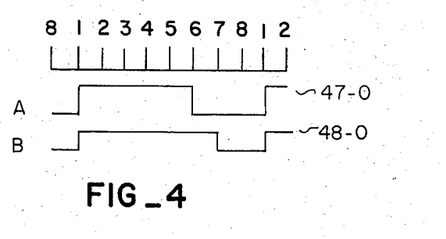
FIG. 4 is the first servo data byte and the second servo data byte respectively for one embodiment of the servo data as illustrated in FIG. 3.

FIG. 4 at A illustrates a typical one of the bytes of the plurality of first servo data 47, e.g., byte 47-0, and FIG. 4 at B illustrates a typical one of the bytes of the plurality of second servo data 48, e.g., byte 48-0. For reasons which will become apparent, the bytes of the plurality of first servo data 47 are different than the bytes of the plurality of second servo data 48. Specifically, the representative byte 47-0 shown in FIG. 4 at A is an 8-bit byte, which is high for bits 1 thru 6 and is low for bits 7 and 8. However, the representative byte 48-0 shown in FIG. 4 at B is high for bits 1 thru 7 and low for bit 8. Consequently, the plurality of first servo data 47 can be distinguished from the plurality of second servo data 48.

The manner in which the plurality of first servo data 47 and the plurality of second servo data 48 provide information indicating the position of the centerline 43 of the reference track 39 with respect to the head 15 is as follows: if the head 15 is precisely centered, as shown in FIG. 3, then as the plurality of first servo data 47 are read by the head 15, a total of 12 bytes 47-2 thru 47-13 will be detected by the head. Then as the plurality of second servo data 48 are read by the head 15, a total of 12 bytes 48-0 thru 48-11 will be counted. The two equal counts are compared indicating a 0 difference, representing the exact centering of the head 15.

Assume now that the head 15 is slightly off center by 2 bytes towards the one side 49 as viewed in FIG. 2, such that the head 15 first reads all 14 bytes 47-0 thru 47-13 of the plurality of first servo data 47. Then the head 15 will read only 10 bytes 48-0 to 48-9 of the plurality of second servo data 48. The inequality of the count represents an off center position of the head 15. Also, as will be further described, the fact that more bytes of the plurality of first servo data 47 than bytes of the plurality of second servo data 48 are counted indicates that the head 15 is off-center towards the one side 49 of the reference track as shown in FIG. 3.

This illustration has been given assuming that the head 15 will read each of the bytes of the reference data which lies to any extent within the sweep of the head 15. However, in the preferred embodiment a threshold of intensity for detection by the head 15 must be met in order to avoid false readings due to noise. Thus the reference data would only be detected if it lies at least, as one example, 25% within the sweep of the head 15 along the reference track 39 as determined by the threshhold signal on line 23. The function of the servo data in the servo data zone 45 is not altered however.

It will be seen that any unequal count or difference in count represents an off-center position of the head 15. The magnitude of the difference is decoded by the decode means 24, which in the preferred embodiment is the servo demodulator circuit 25 (described below), to generate a reference count for each plurality of bursts 41, representing the position of the head 15 relative to the centerline 43 of the reference track 39 as the head 15 reads across the reference data on each of the plurality of bursts 41. The reference count generated by the servo demodulator circuit 25 indicates the amount that the head 15 is off-center and the direction in which the head is off-center.

Figure 5A:
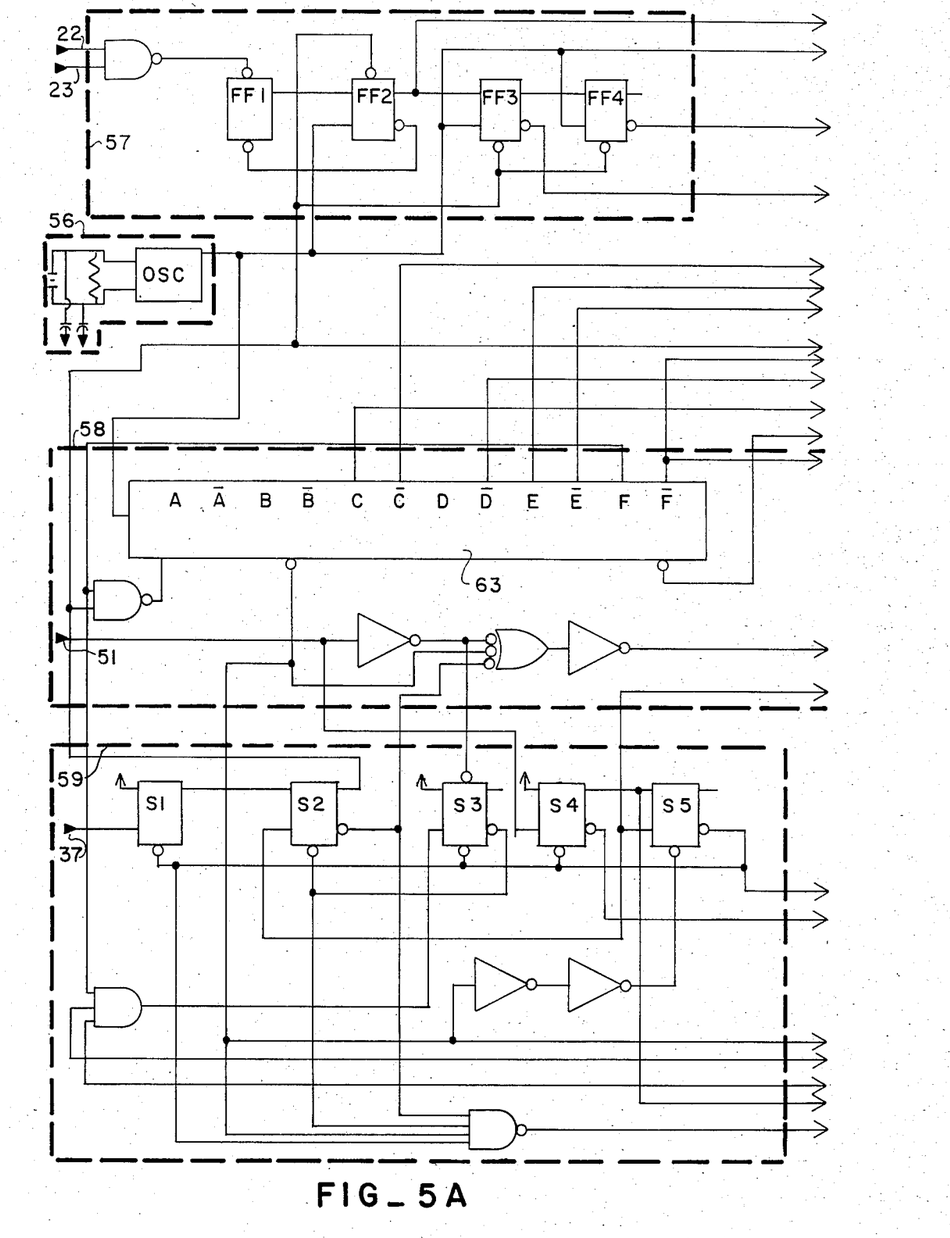
FIGS. 5A and 5B constitute a schematic diagram of the servo demodulator circuit according to one embodiment of the present invention.
Figure 5B:
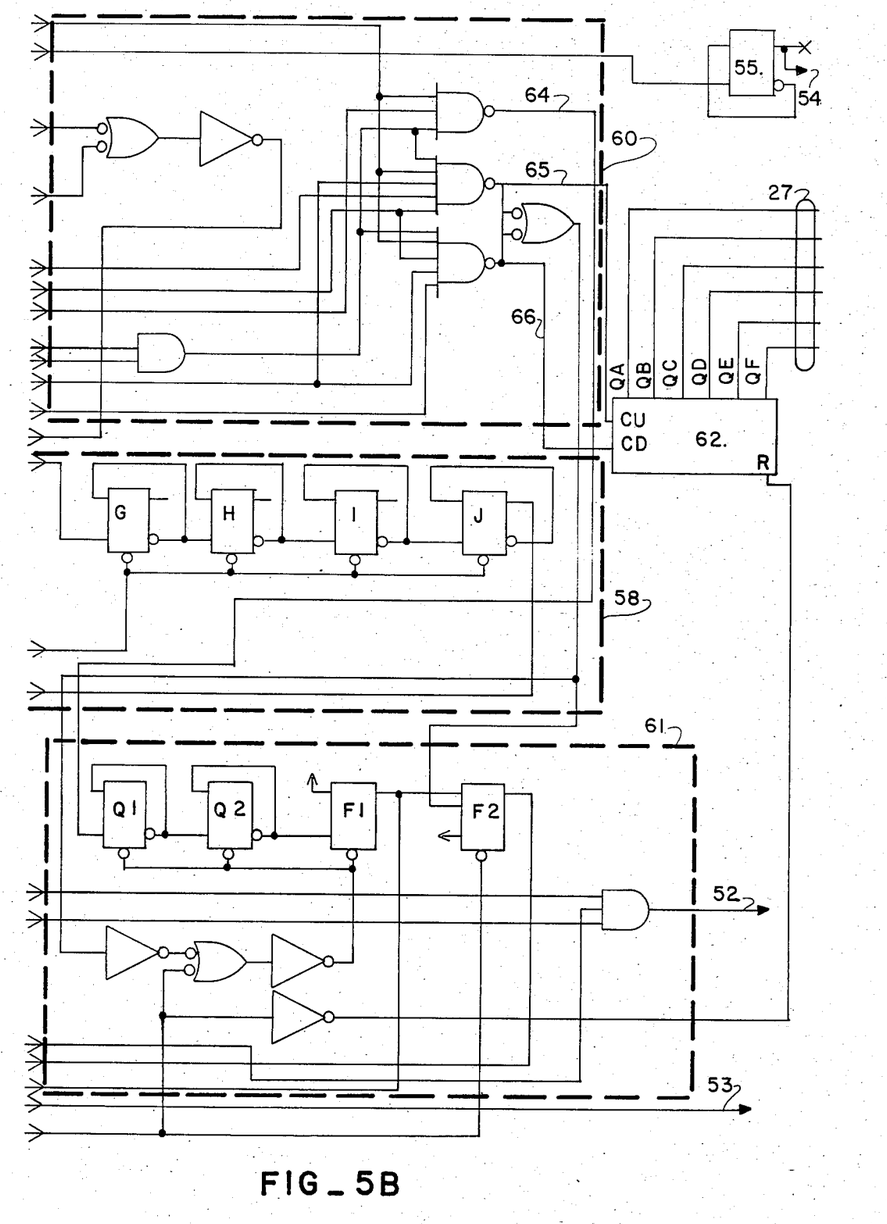

The servo demodulator circuit 25 for receiving the data from the head 15 and decoding it to generate the reference counts is shown schematically in FIGS. 5A and 5B. The lines passing off the right hand side of FIG. 5A line up with the lines entering the left hand side of Fig. 5B, thus connecting the circuity. In order to explain the operation of the servo demodulator circuit 25, reference will be made to the timing diagrams in FIGS. 6 and 7.

As mentioned with respect to FIG. 1, a head 15 communicates across line 20 to the read/write control 19. In the read/write control 19, the signals detected by the head 15 are generated as the data signal across line 22. Further, a threshold signal is generated across line 23. From the data signal and the threshold signal on the lines 22 and 23, the servo demodulator 25 detects the reference data in the bursts 41 as the head 15 reads across the burst 41. Line 22 with the data signal and line 23 with the threshold signal are shown in FIG. 5A in the upper right hand corner.

Further, the servo demodulator circuit 25 receives an index signal across the index input line 37, shown likewise in FIG. 5A on the left hand side. The index signal delivered across line 37 is the output of the OR-gate 36 shown in FIG. 1. The input to the OR-gate 36 is the mechanical index signal across line 35 as discussed above and the pseudo-index signal across the pseudo-index line 38. The pseudo-index signal is generated in the preferred embodiment by the computer means 26 in order to indicate to the servo demodulator circuit 25 the position of each of the bursts 41. Because the bursts 41 in the preferred embodiment are 8 equiradially spaced bursts, the pseudo-index signal is generated by detecting the amount of time that it takes the disk 10 to make one full revolution, that is the time between each of the mechanical index pulses across line 35, and then dividing that time by 8. The result will indicate the amount of time between each of the bursts 41. The position of the first burst 41(1) with respect to the index signal, is generated by dividing the time between each of the bursts 41 by two. Thus, when the mechanical index 35 is received for the reference track 39, the computer means 26 divides the amount of time for one revolution by 8 to determine the time between each of the bursts 41 and then divides the time between each of the bursts by 2 to determine the time between the mechanical index and the first burst 1(1).

The last input into the servo demodulator circuit 25 which is shown in FIG. 5A, is the servo end signal on line 51. The servo end signal is a timing signal generated to indicate the end of a sampling interval as the head 15 reads across the burst 41. In the preferred embodiment the servo end signal is generated by a clock (not shown) which is activated by the index input signal on line 37 and generates a pulse at the end of the set time interval. The preferred embodiment the time it takes for the head 15 to read across a particular burst 41 is about 256 microseconds, so the servo end signal is generated at the end of a 256 microsecond interval after the index pulse on line 37.

The outputs from the servo demodulator circuit 25 are shown in FIG. 5B include the decode bus 27 which will communicate the reference count to the microcomputer 28. The other outputs from the servo demodulator circuit 25 shown in FIG. 5 which are not shown in FIG. 1 include the sampling output on line 52 and the S-index output on line 53. The sampling signal indicates to the microcomputer 28 that the servo demodulator circuit 25 is operating in the sampling mode to generate a reference count. The S-index signal is generated by the servo demodulator circuit 25 to indicate to the microcomputer 28 that the data on the decode bus 27 is a valid reference count.

An additional output shown in FIG. 5B which is not important to the present invention is a 4-megaHertz output on line 54 which is generated using the flip flop 55 to divide the 8-megaHertz signal generated in the servo demodulator circuit 25. The servo demodulator circuit comprises a clock 56 which in the preferred embodiment generates an 8-megaHertz signal; a synchronization circuit 57 w-hich synchronizes the data received across lines 22 and 23 with the 8-megaHertz clock 56; a decode timing counter 58 which generates timing reference signals for the servo demodulator circuit 25; a sequence circuit 59 for controlling the sequence of operation of the servo demodulator circuit 25; a decode circuit 60 for decoding the servo data after synchronization by the synchronization circuit 57 using the decode timing counter as reference; a 2F counter 61 for counting the 2F signals received during the reading of the reference data in the first 2F zone 44 and the second 2F zone 46 for each bursts 41; and an up down counter 62 which generates the reference count for signalling across the decode bus 27 from the signals received from the decode circuit 60.

Figure 6:
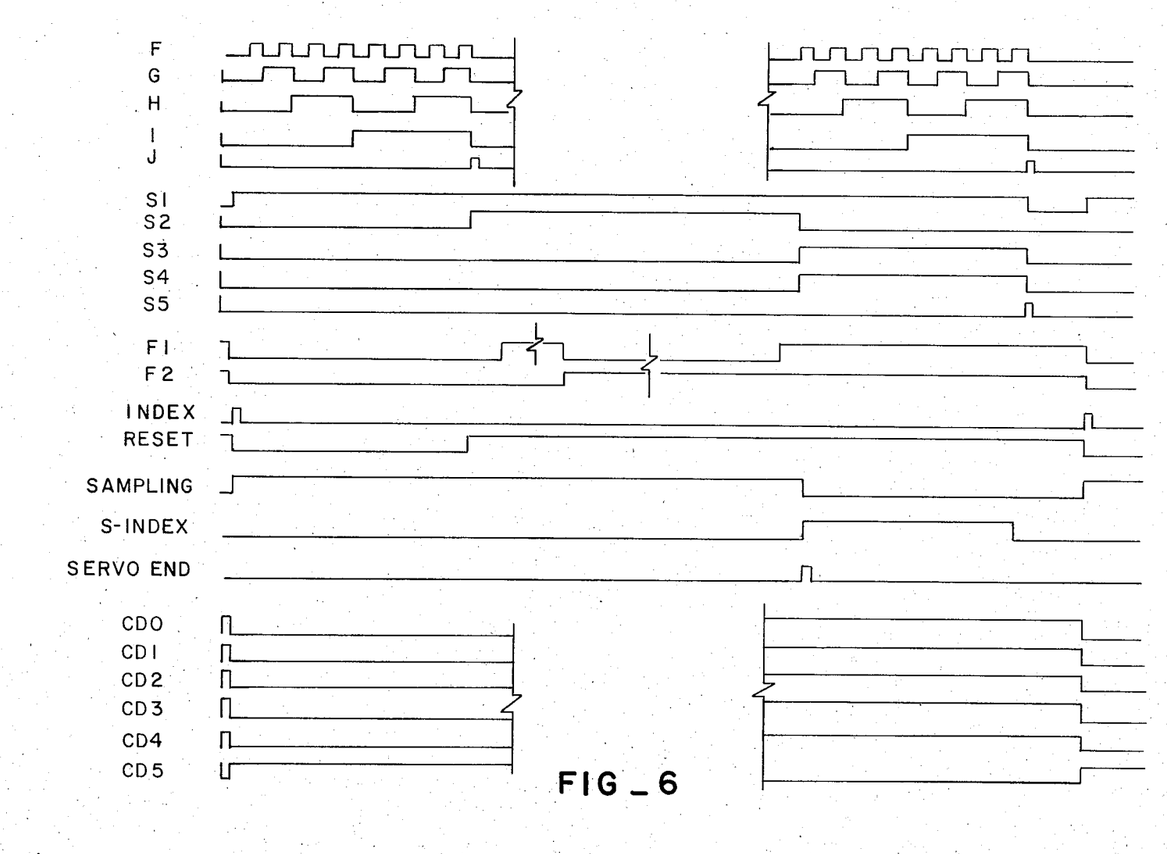
FIG. 6 is a timing diagram for use in description of the demodulator circuit of FIG. 5.

With reference to FIG. 6, the inputs and outputs of the servo demodulator circuit 25 and the operation of the sequence circuit 59 to enable the servo demodulator circuit 25 to decode the reference data in a burst 41 is described.

When the index signal is received across line 37 the flip flop S1 is set. When S1 is set, the decode timing counter 58 is reset and begins counting. Further, the 2F counter 61 is cleared and awaits receipt of the first 2F signal from the decode circuit 60. Further, the sampling signal across line 53 is set, indicating to the microcomputer 28 that the servo demodulator is reading a burst 41. Likewise, when the flip flop S1 is set, the up/down counter 62 is cleared to await the signals from decode circuit 60.

The decode timing counter 58 includes a clock counter 63 which, in one embodiment, is extended by series of four flip flops labeled G, H, I and J in the Figure connected to extend the function of the counter 63. Thus, after the decode timing counter 58 is reset by the setting of the flip flop S1, the clock counter 63 will count up until reset again. When the clock counter 63 has progressed for 64 microseconds, the flip flop J will be set. When the flip flop set J is set, that causes the flip flop S2 in the sequence circuit 59 to be set. When S2 is set the decode timing counter 58 is reset and begins counting again. At this stage, the servo demodulator circuit 25 is in a state for detecting the reference data in the burst 41 being read. This process will be described with reference to the timing diagram on FIG. 7 and is indicated by the breaks in the timing diagram on FIG. 6. At this point, it is sufficient to say in order to describe the sequence circuit 59, that after four 2F signals are decoded by the decode circuit 60, flip flop F1 of the 2F counter 61 will be set. With F1 set, when the first countup or countdown signal is decoded by the decode circuit 60, the flip flop F2 in the 2F counter 61 will be set causing the flip flop F1 to be cleared to wait the second 2F zone 46 of the reference data in the burst 41. During the second 2F zone 46, the 2F counter 61 will count 2F signals until the fourth 2F signal is received enabling F1, at which time both F1 and F2 will be set. This condition could be used to indicate the end of the reading of the reference data on the burst 41; however, in the preferred embodiment, the servo end signal across line 51 is used. As mentioned above, the servo end signal is generated by a clock which generates a signal 256 microseconds after the index signal is received across line 37. The servo end signal clock is not shown in FIG. 5.

Because each signal decoded by the decode circuit 60 resets the decode timing counter 58, and each of the signals in the reference data is shorter than the time it takes for the clock counter 63 to count up to enable the output F on the clock counter 63, no F signals will be received until the end of the reference data on the burst 41. Thus, when the output F is enabled after reading of the reference data, the flip flop S3 and the sequence circuit is set causing the flip flop S2 in the sequence circuit to be cleared. Meanwhile, the servo end signal causes the flip flop S4 in the sequence circuit 59 to be set which in turn causes the sampling output on line 52 to go low and causes the S-index output on line 53 to go high.

When the decode timing counter 58 counts up to enable the flip flop J, the flip flop S5 in the sequence circuit 59 is enabled, clearing the flip flops S1, S3 and S4 in the sequence circuit 59.

The clearing of the flip flop S4 in the sequence circuit 59 causes the S-index output on line 53 to go low. Then the circuit is in condition to await the next index signal on line 37 to begin the process again. Recall that during the S-index signal on line 53 that the microcomputer samples a reference count on the decode bus 27.

Figure 7:
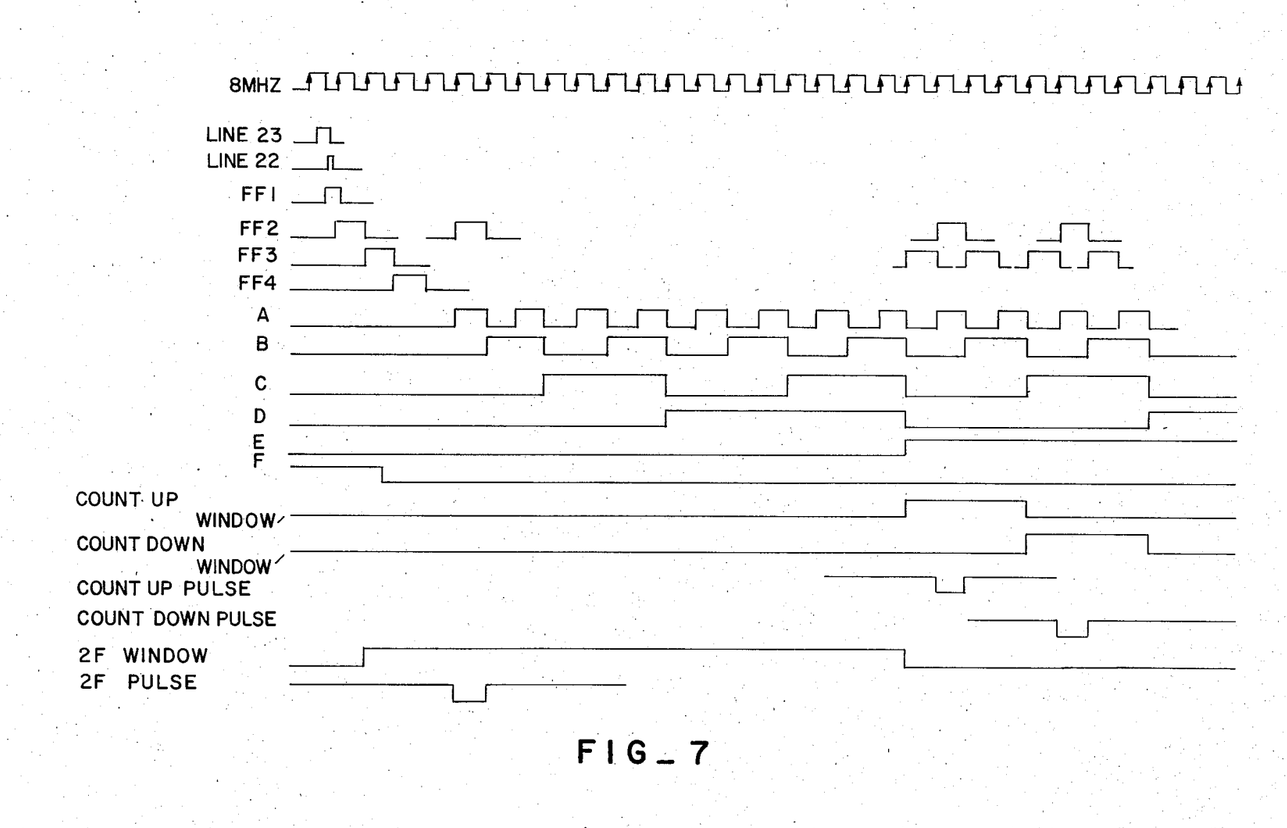
FIG. 7 is also a timing diagram for use in description of the demodulator circuit of FIG. 5.

As discussed above, when the flip flop S2 in the sequence circuit 59 is set, the servo demodulator circuit 25 is in a state for decoding the servo data received from the read/write control 19 across the line 22 and 23. With reference to FIG. 7, the operation of the decode circuit 60 and the generation of the countup, countdown and 2F signals is discussed.

When the data signal on line 22 and the threshold signal on line 23 coincide, the flip flop FF1 in the synchronization circuit 57 is set. On the next upward swing of the 8-megaHertz clock signal, flip flop FF2 will be set, synchronizing the input with the clock. On the next clock signal flip flop FF3 is set which causes the decode timing counter 58 to be reset and to begin counting to await the next signal received over lines 22 and 23. The interval between the receipt of the first signal which resets the decode timing counter 58 and the receipt of the next signal will be decoded by the decode circuit 60 to indicate whether the head is reading a 2F zone in the reference data or the plurality of first servo data 47 indicating a countup or the plurality of second servo data indicating a countdown. Thus the decode circuit 60 can be viewed as generating a countup window, a countdown window, and a 2F window as illustrated in FIG. 7.

Logically, the 2F window occurs if the flip flop FF2 is set and the outputs, E and F, on the decode timing counter 58 are low. Thus, if a signal is received during the period it takes the decode timing counter 58 to count up to enable the input E, then the decode circuit 60 indicates a 2F signal which is received by the 2F counter 61 enabling the flip flop Q1 (not on timing diagram of FIG. 7), after a series of 2F signals are received, F1 is set as described with reference to FIG. 6.

The countup window occurs logically if the flip flop FF2 is set AND F is low in the decode timing counter 58 AND flip flop S2 is set in the sequence circuit 59 AND output D in the decode timing counter is low AND C in the decode timing counter 58 is low AND output E in the decode timing counter is high.

The countdown window occurs when F in the decode timing counter 58 is low AND F2 in the sequence circuit 59 is set and flip flop FF2 is set in the synchronization circuit 59 AND the output E in the decode timing counter 58 is high AND the output D in the decode timing circuit 58 is low AND the output C in the decode timing circuit 58 is high.

With the bytes of servo data configured as shown in FIG. 4, after being inverted at the NAND-gate 67, the plurality of first servo data 47 will cause count up signals and the plurality of second servo data 48 will cause count down signals.

Thus, if a 2F signal is detected, a 2F pulse is generated along the line 64. If a countup signal is detected indicating that the head 15 is passing over one of the bytes of the plurality of first servo data 47, then a countup pulse is generated over line 65. Likewise if a countdown signal is decoded, indicating that the head 15 is reading one of the bytes of the plurality of second servo data 48, then a countdown pulse is generated over line 66. The countup and countdown pulses over line 65 and 66 are received by the up/down counter 62. After the up/down counter has received all the countup and countdown signals, then the data on the outputs QA thru QF of the up/down counter 62 are presented as a reference count to the decode bus 27. When the microcomputer 28 receives the S-index signal on line 63, then the reference count on the decode bus 27 is sampled. Each time the head reads across a burst 41 on the reference track 39, a reference count is sampled across the decode bus 27 by the microcomputer 28.

The microcomputer 28 is programmed to generate the pseudo-index signals across line 38 as described above, to receive and store the reference counts for each of the plurality of bursts 41 and to calculate a runout factor from the plurality of reference counts indicating the deviation of the centerline of the reference track from the head 15 and the head 15 reads the plurality of bursts 41 spaced around the reference track. Further, the microcomputer is programmed to generate a runout signal across the servo bus 29 to control means 64 such as the microstep control 13 in the servo means 11. The control means receives the runout signal causing the positioner 14 to position the head 15 so that the head 15 is positioned to reduce the deviation of the centerline and plurality of concentric circular data storage track 17 from the head 15 and the rotatable drive 16 turns the disk-shaped data storage medium 10 for reading and writing by the head 15.

Figure 8:
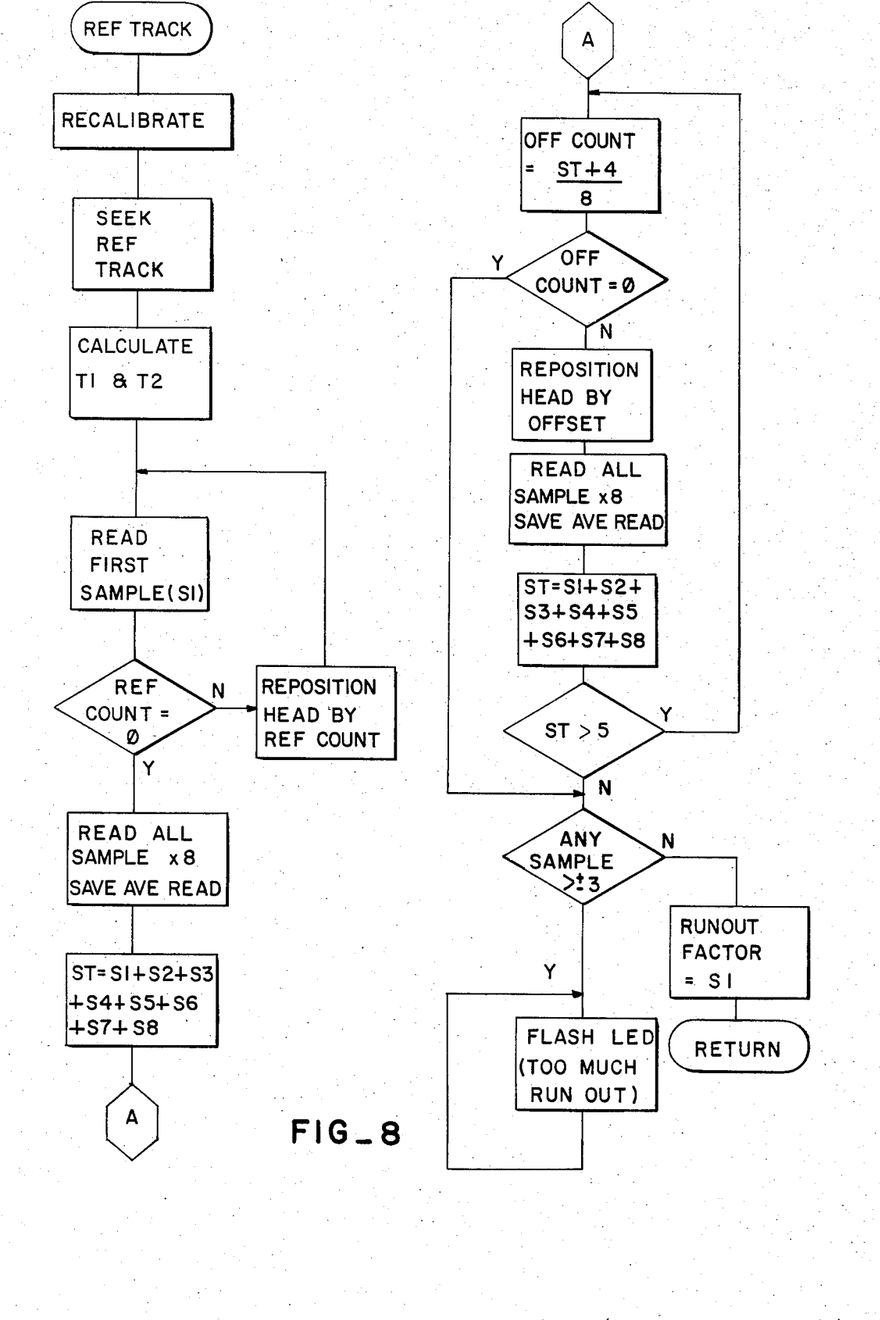
FIG. 8 is a flowchart of the function of one embodiment of the present invention.

The programming of the microcomputer 28 can be seen generally with reference to the flowchart in FIG. 8. The flowchart in FIG. 8 shows the generation of the runout factor according to the preferred algorithm as programmed in the microcomputer 28.

The flowchart shows a Reference Track Subroutine (REF TRACK). The first step in the reference track subroutine is to recalibrate the positioning of the head 15 by seeking the guardband 42 near the outside circumference 40 of the disk-shaped data storage medium 10. The recalibration may be accomplished in other ways as suits the user.

Next the microcomputer 28 or computer means 25 causes the head 15 to seek the reference track 39 according to stored information with regard to the position of the reference track 39 in relation to the position of the guardband 42 (SEEK REF TRACK).

The next step, the timing for the generation of the pseudo-index pulses across line 38 is calculated as discussed above. (CALCULATE $T_1$ AND $T_2$.) For the purpose of the flowchart, $T_1$ is equal to the time between the servo sector 21 and the first burst 41(1). $T_2$ is equal to the time between each burst 41.

The next step in the reference track subroutine involves reading the first burst 41(1) in the reference track 39 to generate a reference count (READ FIRST SAMPLE). If the reference count is equal to 0 (REF COUNT=0), then the servo demodulator circuit 25 will have detected an equal number of the plurality of first servo data 47 and of the plurality of second servo data 48 indicating that the head 15 is positioned over the center line 43 of the burst 41(1). If the reference count is not equal to 0, then the head 15 is repositioned by the microstep controller 13 in response to a runout signal generated by the computer means 25, according to the reference count (REPOSITION HEAD BY REF COUNT), and read again and so on until the head 15 reads across the centerline 43 in the burst 41(1) on the reference track 39. Next the microcomputer 28 directs the servo demodulator 25 to read the position of the centerline 43 of the reference track 39 at each of the 8 bursts 41(1)–41(8) eight times each. The average of the eight reads for each burst 41 is calculated and stored (READ ALL SAMPLE X8 & SAVE AVE. READ). Next a sample total ($S_T$) is calculated by adding the average reference count for each of the eight bursts 41 ($S_T=S_1+S_2+S_3+S_4+S_5+S_6+S_7+S_8$).

The next step involves detecting whether the amount of runout is an acceptable amount which can be compensated for without causing errors in the reading of data by the head 15. Thus an offset count is calculated in the computer means 26 which is equal to the sample total $S_T+4$ divided by 8, where any fractional value is rounded down to the lower integer (OFF COUNT=$(S_T+4)/8$). Thus, if the sample total $S_T$ is between the values of $-4$ and $+3$, then the offset count will be equal to 0 otherwise the offset count will be non-zero.

If the offset count is equal to 0, then there may be an acceptable amount of runout which can be compensated for. If the offset count is not equal to 0, the head 15 is repositioned by the microstep controller 3 in response to a runout signal generated by the computer means 26 according to the value of the offset count (REPOSITION HEAD BY OFFSET) and each of the reference data on each of the bursts 41 is read 8 times and averaged again (READ ALL SAMPLE X8 SAVE AVE READ) and a new sampling total ($S_T$) is generated ($S_T=S_1+S_2+S_3+S_4+S_5+S_6+S_7+S_8$). If $S_T$ remains greater than 5, then the program loops back to determine a new offset count and to follow through the loop until an acceptable offset count is obtained by positioning the head 15.

When an acceptable offset count is obtained by positioning the head 15, then the computer means 26 determines whether any sample from any of the bursts 41 is greater than plus or minus 3 (ANY SAMPLE> $\pm3$). If the head 15 detects as it is reading across any of the bursts 41 a sample of greater than plus or minus 3 then there is too much runout and the computer means 26 directs an LED to flash indicating that the disk-shaped data storage medium 10 is improperly secured in the disk drive 16 (FLASH LED (TOO MUCH RUNOUT)). If an acceptable offset is obtained and there are no samples which are greater than plus or minus 3, then a runout factor is stored which is equal to the final reference count for the first burst 41(1) after the head 15 has been repositioned to obtain an acceptable offset count (RUNOUT FACTOR=$S_1$).

Because each of the plurality of concentric circular data storage tracks 17 includes a servo sector 21 in which reference data similar to that stored in each of the bursts 41 on the reference track 39 are stored, the runout factor generated by microcomputer 28 is used to position the head 15 to minimize the effects of runout as the head 15 reads around each of the plurality of concentric circular data storage tracks 17.

Figure 9:
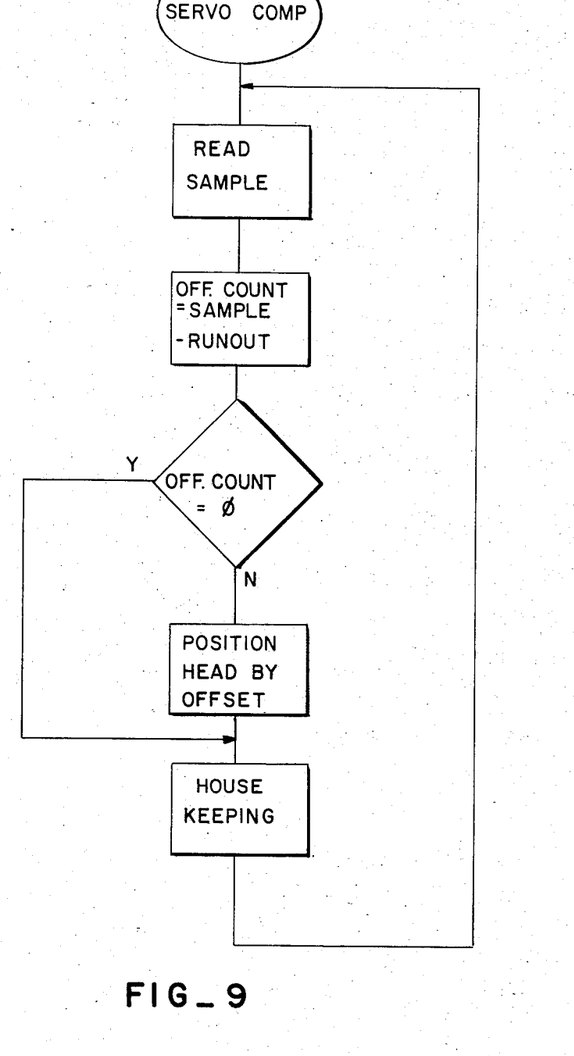
FIG. 9 is a flowchart showing further the function of one embodiment of the present invention.

The process for correcting the positioning of the head 15 for each of the plurality of concentric circular data storage tracks 17 besides that of the reference track 39 is explained with reference to the flow chart of FIG. 9. This is called the servo compensation subroutine in the microcomputer 28 (SERVO COMP). The first step involves reading the sample of the reference data in servo sector 21 of a particular data track 17 (READ SAMPLE). The offset count for the particular track is calculated which is equal to the sample as detected by the head 15 in the servo sector 15 minus the runout factor stored by the microcomputer (OFF COUNT=SAMPLE−RUNOUT). If the offset count is equal to 0 (OFF COUNT=0) then the head 15 is positioned properly and the track is read as indicated by the block called "HOUSEKEEPING". If the offset count is not equal to 0 then the head 15 is positioned by the microstep controller 13 in response to a runout signal generated by the computer means 26 according to the offset count to account for the runout (POSITION HEAD BY OFFSET). With the position of the head 15 compensated for the runout, the track is read or otherwise operated upon (HOUSEKEEPING).

Thus the runout detection accomplished by reading the reference track 39 is used to compensate for the effects of runout on each of the concentric circular data storage tracks 17 on the disk 10. In this manner, runout is compensated for or detected using a minimum amount of space on the data storage medium. Further the accuracy and simplicity of runout detection is enhanced according to the present invention.

Other aspects and advantages of the present invention can be determined from a study of the drawings, specification, and the claims herein.

We claim:

1. A servo control apparatus for controlling a servo means for positioning a head that reads data on a data storage medium having a plurality of concentric circular data storage tracks, each of the concentric circular data storage tracks having a centerline, the data storage medium being secured on a rotatable drive, the servo control apparatus comprising:
   reference track formed on one of the plurality of concentric circular data storage tracks, said reference track having a plurality of bursts of reference data spaced around said reference track;
   said bursts of reference data containing data indicating the position of the head relative to the centerline of said reference track as the head reads said reference data on said bursts;
   decode means in communication with the head for decoding said reference data as said head reads said bursts to generate a plurality of reference counts representing the position of the head relative to the centerline of said reference track as the head reads said reference data on said plurality of bursts;
   computer means in communication with said decode means for storing said plurality of reference counts, for calculating a runout factor from said plurality of reference counts indicating the deviation of the centerline of said reference track from the head as the head reads said plurality of bursts spaced around said reference track and for generating a runout signal from said runout factor;
   wherein said computer means incudes:
   (a) means for summing said plurality of reference counts;
   (b) means for adding the value of about four to the sum of the plurality of reference counts, and for dividing the resultant value by the value of about eight to determine the offset count;
   (c) means for rounding the offset count down to the lower integer and determining if the offset count is about zero;
   (d) means for determining if the absolute value of any reference count is greater than the value of about three;
   (e) means for generating a runout factor equal to a first reference count of said plurality of reference counts responsive to the offset count being about zero and the absolute value of each reference count being less than the value of three; and
   control means in communication with said computer means and with the servo means for causing the servo means to position the head in response to said runout signal so that the head is positioned to reduct the deviation of the centerlines of the plurality of concentric circular data storage tracks from the head as the rotatable drive turns the data storage medium for reading by the head.

2. The servo control apparatus of claim 1 wherein at least one track of the plurality of concentric circular data storage tracks other than said reference track includes:
   a servo sector having track reference data stored therein containing data indicating the position of the head relative to the centerline of said at least one track as the head reads across said servo sector, and wherein
   said decode means further generates a track reference count for said at least one track for storage by said computer means as the head reads said servo sector, and said runout signal is generated in response to said track reference count of said at least one track and said runout factor.

3. The servo control apparatus of claim 1, wherein said reference data comprises:
   a plurality of first servo data being stored across said reference track at substantially one side of the centerline of said reference track, and
   a plurality of second servo data being stored across said reference track at substantially the other side of the centerline of said reference track, and wherein
   the number of said first servo data detected by said head for one burst of said plurality of bursts is compared in said decode means to the number of said second servo data detected by said head for said one burst to generate said reference count for said one burst.

4. The servo control apparatus of claim 3, wherein:
   the number of said plurality of first servo data that is detected by the head increases as the centerline of said reference track deviates so that the head reads successively further to said one side of the centerline of said reference track on said bursts; and
   the number of said plurality of second servo data that is detected by the head increases as the centerline of said reference track deviates so that the head reads successively further to said other side of the centerline of said reference track on said bursts.

5. The servo control apparatus of claim 1, wherein:
   said plurality of bursts of reference data are spaced substantially equiradially around said reference track.

6. The servo control apparatus of claim 1, wherein:
   there are eight of said bursts of reference data spaced in substantially equal radial intervals around said reference track.

7. The servo control apparatus of claim 1 wherein:
   said control means for causing the servo means to reposition the head responsive to the value of the offset count if the offset count is other than about zero;
   said decoder means for again generating another plurality of reference counts:
   said computer means for summing the another plurality of reference counts and determining if the sum is greater than the value of about five.

8. The servo control apparatus of claim 1 wherein:
   said computer means includes means for determining from a first of said reference counts, corresponding to a first burst of reference data, if the head is centered on the centerline of the reference track at least at the location of said first burst of reference data;

said control means for causing the servo means to position said head so that the head is centered on the centerline of the reference track at least at the location of said first burst of reference data before the plurality of reference counts is summed.

* * * * *